United States Patent [19]

Reynolds

[11] Patent Number: 4,915,784

[45] Date of Patent: Apr. 10, 1990

[54] PROCESS AND APPARATUS FOR REMOVING CONTAMINANTS FROM PULP DIGESTER VENT GAS

[76] Inventor: Ellis W. Reynolds, 2506 Acadie Dr., Jacksonville, Fla. 32217

[21] Appl. No.: 346,634

[22] Filed: May 3, 1989

[51] Int. Cl.[4] .................. D21C 11/06; C07C 7/00
[52] U.S. Cl. .................................. 162/15; 162/239; 162/242; 203/DIG. 16; 585/803
[58] Field of Search .............. 162/15, 29, 44, 239, 162/240, 242; 203/39, 42, 87, DIG. 16; 585/803

[56] References Cited

U.S. PATENT DOCUMENTS

| | | | |
|---|---|---|---|
| 3,183,145 | 5/1965 | Collins | 162/15 |
| 3,492,198 | 1/1970 | Rosenblad | 162/15 |
| 3,607,617 | 9/1971 | Drew | 162/15 |
| 3,753,851 | 8/1973 | Gaillard | 162/15 |
| 3,764,461 | 10/1973 | Baierl | 162/15 |
| 3,816,239 | 6/1974 | Marks | 162/239 |

Primary Examiner—Wilbur Bascomb

[57] ABSTRACT

There is provided a process and apparatus for improving the yield of turpentine collectable from the vent gases emanating from a pulp disgester in a kraft paper pulp Process. The apparatus is characterized by the insertion in a conventional turpentine recovery system of a gas/liquid contact vessel for intimately contacting the hot turpentine containing vent gas from a pulp digester with liquid foul condensate recycle from a turpentine decanter and a condenser for condensing the condensible components of the recycle treated vent gas, whereby the foul condensate is greatly improved as to contaminant content and rendered suitable for reuse in the plant.

5 Claims, 1 Drawing Sheet

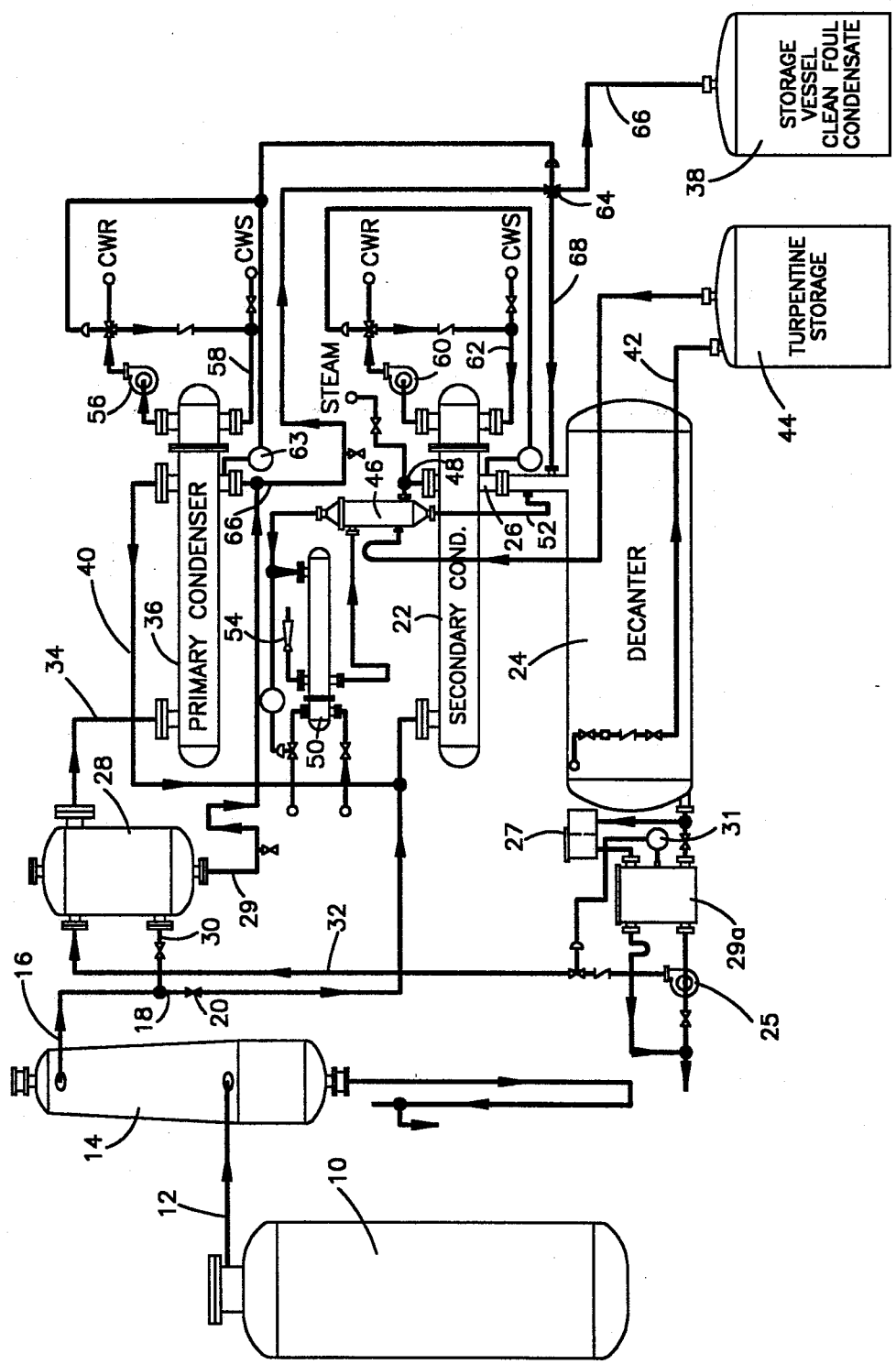

PROCESS AND APPARATUS FOR REMOVING CONTAMINANTS FROM PULP DIGESTER VENT GAS

This invention relates, as indicated, to a process for removing contaminants, such as, noncondensible hydrocarbons and sulphur-containing organic compounds, from the vent gas issuing from a paper pulp digester and for enhancing the recovery of turpentine from paper pulp digesters. This process renders the resultant condensate suitable for process uses in the pulp mill, such as brown stock pulp fiber wash, dregs wash, or green liquor production.

BACKGROUND OF THE INVENTION AND PRIOR ART

The present state of the art process for the recovery of turpentine in Kraft pulp mill operation involves separation of the digester vent gas from black liquor carry over, then condensing the steam and turpentine in a condenser. The combined condensate (water and turpentine) is received in a decanter, and a noncondensible gas stream (NCG) is vented from the decanter, cooled in a gas cooler and discarded. The light sulfur compounds are thus dissolved in the hydrocarbon (turpentine) phase causing the sulfur content of the oil phase to achieve an unacceptable level for turpentine buyers.

The turpentine is separated by gravity and allowed to drain off as produced. The foul condensate, or water phase, is hydraulically displaced to a sewer, and contains various organic compounds that raise the biological oxygen demand (BOD) level of the waste water disposal ponds.

The present invention is an improvement on the prior art process. and contemplates a method whereby the foul condensate containing organic sulphides and hydrocarbons is stripped of most of these pollutants by recycling a liquid foul stream through a reconditioning drum, or gas/liquid contact vessel, e.g. a tower packed with Raschig rings or other conventional packing, that provides for good gas/liquid contact with the incoming hot vent vapor gas from the digester. The residual organic compounds in the foul stream are revaporized or azeotroped over into the recovery system of the present invention. As these compounds recycle in the foul condensate stream, they attain an equilibrium and are ultimately removed in the decanter with the main portion of the turpentine. The resultant level of contaminants in the off-gas stream is reduced from about 300-3500 ppm to a level below 40 ppm in the novel process hereof without adding prime steam to the system, thereby effecting a considerable saving in power requirements. Moreover, the present improved process does enhance the overall production of turpentine by a considerable amount e.g., as much as 3%-5%, from the foul condensate which was heretofore lost. The increase in turpentine production will allow most mills to recoup the cost of retrofitting existing equipment, as hereinafter disclosed, in a relatively short period, e.g., about 24 months. Systems currently available use stripping systems that require large volumes of costly prime steam to accomplish a similar result.

BRIEF STATEMET OF THE INVENTION

Briefly stated, the present invention is in a plant for stripping contaminants or pollutants from the gas issuing from a pulp digester, said plant including a pulp digester, a black liquor separator, a decanter to separate turpentine condensed from the digester gas, and a primary condenser, the improvement which comprises a gas/liquid contact vessel for intimately contacting the hot turpentine-containing pulp digester gas with liquid foul condensate recycle from the decanter to yield a gaseous effluent containing a condensible fraction useful in the plant (clean foul condensate), noncondensible gas, and turpentine, a condenser for condensing the gaseous effluent to yield a dirty foul condensate, and a gaseous fraction containing turpentine and noncondensible gases, and a stripper for removing the turpentine from the cooled, dry, noncondensible gases, the turpentine being collected or returned to the decanter.

The invention also contemplates in a process for treating contaminated vent vapors from a paper pulp digester including the step of separating black liquor and a vapor containing turpentine, steam, and noncondensible gases, the improvement which comprises contacting said vapor with recycle foul condensate from the decanter in a gas/liquid contact vessel to yield a turpentine - rich liquid which is separated out, and a vapor containing the foul condensate and noncondensible gases, condensing the foul condensate from said vapor, and stripping the remaining vapor into turpentine (for return to the decanter) and noncondensible gases.

The present invention provides, then, a method and apparatus for removing all the steam condensed from the vent gas or relief gas stream and to recover it as "clean" foul condensate acceptable for use in the pulp process; to recycle the "dirty" foul condensate back into a stripper vessel to extract 80% to 90% of the residual organic compounds from the stream; and to control the amount of sulfur compounds allowed to remain with the turpentine thus reducing the level of solubilized sulfur compounds in the decanter turpentine (hydrocarbon) phase.

The removal of contaminants in the foul condensate to a level to make it suitable to recycle back into the process.

BRIEF DESCRIPTION OF THE DRAWING

The invention may be better understood by having reference to the annexed drawing which is illustrative of a preferred embodiment of the present invention, and wherein:

The drawing is a diagrammatic and schematic illustration of an apparatus of the present invention and flow diagram showing the novel process hereof.

DETAILED DESCRIPTION OF THE INVENTION

As indicated above, the present invention is in a novel system or apparatus for carrying out a novel process. The essence of the invention is in the use of what I call "foul condensate" derived from the vent vapors from the digester, in a liquified state as a recycle for contacting with the vent vapor in a gas/liquid contact vessel. This has the effect of concentrating the "foul condensate" to an equilibrium state in the recycle stream, and enriching the turpentine concentration in the overhead stream. The "foul condensate" bottoms from the gas/liquid contact vessel are returned to the primary condenser for ultimate delivery to the decanter. The heavier aqueous liquid in the decanter is foul condensate returned to the system as recycle. The enriched vapor overhead then passes through a selective condenser where vaporized "clean" foul condensate liquid is condensed and removed from the from the selective condenser. The turpentine enriched vapor together with noncondensible gases (NCG) are passed to the primary condenser to separate the NCG, and the liquid turpentine and any foul condensate returned to the decanter for separation of these immiscible liquids. The turpentine, taken from the top of the decanter then goes to storage as a salable product. The foul condensate collected in the decanter is returned as recycle for contact with the vent vapor, as above stated.

In a preferred embodiment of the invention, a stripper is provided for further refining the vent gas in the turpentine storage vessel. This is a relatively short tower which functions to remove water and turpentine from the NCG and to clean the water, turpentine and NCG by refluxing. The cleaned water and turpentine drain to the decanter. The vapors from the stripper go to disposal, such as a lime kiln. The drawing shows in diagrammatic form an eductor 54. A fan would work as well.

Referring now more particularly to the drawing, there is here shown an apparatus in schematic form, for carrying out the novel process of the present invention. Valves existing in the typical old system that are not used in the present invention are in solid black indicating that they are normally closed in the improved system and process.

There is thus provided at least one paper pulp digester 10 with a vent line 12 leading to a liquor separator 14 from which is recovered residual digester carryover black liquor and a small amount of turpentine and C-10 alcohols. The vent gas exits the system at a relatively high temperature, e.g., above about 212 F. The turpentine content of the vapors discharged from the digester 10 will range broadly from 0.1% to about 15%, and as a median value, from about 0.3 to 11.5% by volume. The vapors discharged from the separator 4 through conduit 16 will also contain steam and NCG.

In a conventional pulp mill, these vapors go directly through a line 18 and valve 20 to a condenser 22. The condensate from condenser 22 is then conducted to a decanter 24 through a pipe 26. As shown in the drawing, the valve 20 (shown in solid black) is closed off in the present apparatus and what was before designated the "primary condenser" (22) is now designated a "secondary condenser" 22.

For the purposes of the present invention, the vent line 16 carries the vent gas including noncondensible gas (NCG) at a temperature of from about 212 F. to about 230 F. to a gas/liquid contact vessel 28 or stripping vessel 28. Here the vent gas is brought into intimate gas/liquid contact with recycle "foul condensate" at about 180 F. in a counter-current manner. The "foul condensate" is at this point what I call "dirty foul condensate." The hot vent gas enters the gas/liquid contact vessel 28 through the line 30 near the lower end thereof and flows upwardly and in intimate contact with the downwardly flowing "dirty foul condensate" liquid entering at the upper end of the tower through the line 32. The "dirty foul condensate" amounts to about 20-40 volume % of the original vapor volume. The "dirty foul condensate" is received from the bottom of the decanter 24. The flow of "dirty foul condensate" to the tower 28 need not be controlled. Under the influence of a pump 25, the "dirty foul condensate" is passed over a weir 27 into a receiver 29a from whence it is pumped by the pump 25 through the conduit 32 into the gas/liquid contact vessel 28 or stripping vessel 28. The device 31 is identified by a circle indicates a conventional liquid level controller.

The vapor is slightly cooled albeit still above about 212 F. and is conducted through a conduit 34 to a primary or selective condenser 36 where from 50% to 90% of the vent gas stream is condensed. The remaining portion (mainly steam) is used as a carrier gas to purge the system of turpentine. The condenser 36 is operated at a temperature sufficient to condense the "clean foul condensate" contained therein to a temperature of about 206 to 209 F. by means of cooling liquid from a cold water source (CWS) for delivery to a "clean foul condensate" storage vessel 38. "CWR" in the drawing indicates a cold water return. The so called "clean foul condensate" is available for use in the plant. The "clean foul condensate" is contaminated, but the contamination is a small fraction of what it is in the conventional foul condensate normally going to sewer. The "clean foul condensate" is suitable for pulp washing or green liquor production. This usually amounts to about 60% to 80% by volume of the materials entering the condenser 36.

The condenser 36 is selective, condensing only a portion of the condensibles in the vent gas and yields an off-gas containing the turpentine and NCG amounting to about 40% of the volume entering the condenser 36. This off-gas has a temperature of about 212 F. The off-gas is then fed from the primary condenser 36 into the secondary condenser 22 through the line 40 where it is fully condensed using a cooling medium, e.g., water. The temperature of the condensate is reduced to about 180 F. for entry into the decanter 24 which temperature reduction condenses the turpentine and water (foul condensate) and separates out the NCG. The NCG consists primarily of air and light sulfur compounds, such as, dimethyl sulfide, carbon disulfide and mercaptans. The NCG portion is then routed through line 48 to a reflux tower 46 and further cooled to a predetermined controlled temperature by the reflux condensate from reflux condenser 50. The turpentine flows from the decanter 24 through an overflow line 42 to a turpentine storage 44 as a salable product. Any NCG is educted from the system through an eductor 54 for further treatment to remove any sulfur compounds that may be present. As indicated above, sale or in plant use of this turpentine enables recovery in a relatively short time of the cost of retrofitting a conventional pulp mill to include the present apparatus and process.

A large portion of the steam in the gas stream is removed in the primary condenser 36 leaving the condenser 36 as hot clean condensate suitable for use in the pulp mill. On start-up of the system, a diverter valve 64 directs on-specification-condensate to the storage vessel 38 at a temperature controlled by a temperature controller 63 in the condensate discharge line 66. Condensate drained from the stripping vessel 28 is combined with the condensate from the primary condenser 36 and routed to the storage vessel 38 through the line 66. Off-specification-condensate is routed through the diverter valve 64 and line 68 to the decanter 24 for a brief period during start-up while the system is coming up to operating temperature, or during periods of unexpected upset when the system may go out of control. Condensate from the secondary condenser 22 is routed through a stilling well 26 to the decanter 24.

In preferred embodiments of the present invention, there is provided a stripping column and a stripping step. Thus, there is shown in the annexed drawing a stripping column 46. This device accepts vapor or gas accumulating in the condenser 22 and in the outage of the turpentine storage vessel 44, and strips out any turpentine by cooling with cold water and recycle condensate, from the NCG. the off-gas or vapor from the secondary condenser 22 enters the bottom of the stripper 46 at a temperature of about 190 F. through a conduit 48 along with the vapor emanating from the turpentine storage vessel 44 at a lower temperature. Cold water is introduced into a heat exchanger 50 to liquify any condensible components of the combined off-gases and vapor and reduce the temperature thereof to about 150 F. for return through the conduit 52 to the decanter. The condensate depleted gas consists mainly of noncondensible gases that have followed the material through the entire process. These are exhausted in a conventional manner through the gas eductor 54 to a conventional lime kiln (not shown).

The water insoluble hydrocarbons, or turpentine, in the decanter 24 are decanted through a line 42 to a storage tank 44. The water phase is then routed through a weir box 27 from which the rate of condensate removal can be monitored or measured. From the weir box 27, the aqueous phase or "foul condensate" enters a foul condensate receiver 29a. The flow of foul condensate from the receiver 29a is controlled by a liquid level control 31 and moved by pump 25 through the line 32 into the stripping vessel 28. The liquid phase leaves the stripping vessel 28 by a drain line 29 and is combined with the condensate from the primary condenser 36 at the line 66 to leave the system through the diverter valve 64. The system thereby ultimately discharges all "dirty" foul condensates as "clean" foul condensate through the line 66.

A pump 56 and a temperature control loop 58 are provided for the primary, or selective, condenser 36 to maintain the high temperature (212 F.) in the condenser to hold selective condensing temperature conditions therein. Likewise, a pump 60 and a temperature control loop 62 are provided for the primary condenser 22 to hold the temperature conditions therein.

The unnumbered circles and the circle 63 on the drawing indicate conventional temperature indicating controllers.

The apparatus of the present invention is conveniently operated at atmospheric pressure although superatmospheric and subatmospheric pressures may be used.

The art is replete with examples of different kinds of gas/liquid contacting devices, condensers, heat exchangers, stripping means and the like. Any of such known devices may be used herein.

There has thus been provided a system and apparatus wherein residual Chd $2$-$C_{10}$ hydrocarbons in the condensate are reduced by 80% to 90% of the level normally found in conventional kraft paper pulp turpentine recovery systems. Turpentine production is found to be increased by as much as 5%. Hot water in the form of "clean" foul condensate is suitable for reuse in the process, whereas in the past, the "dirty" foul condensate could only be sewered. The toxicity level of the effluent stream is greatly reduced. Organic contaminants can be removed from streams normally sewered to render those streams clean to a level suitable for reuse in the processing plant. The hot "clean" foul condensate is cleaned to a level that allows that stream to be used as process hot water for brown stock washing, dregs wash or geen liquor make-up thereby reducing the demand of the plant for fresh water. Little prime steam is required in the new process hereof.

What is claimed is:

1. In an apparatus for increasing the yield of turpentine recoverable from the hot vapor containing turpentine, foul water and noncondensible gas issuing from a pulp digester, said apparatus including at least one digester yielding said hot vapor, means for conducting said hot vapor to a separator for removal of carry over black liquor from said hot vapor, means for conducting black liquor depleted hot vapor from said separator to a first condenser, a first condenser for condensing the turpentine and foul water phases in said hot vapor and separating them from non-condensible gases, means for conducting the condensate including turpentine and foul water to a decanter, and a decanter for separating turpentine and foul water condensate phases; the improvement which comprises: (a) means for conducting said hot vapor to a gas/liquid contact vessel, (b) means for recycling liquid foul water from said decanter to said gas/liquid contact vessel, (c) a gas/liquid contact vessel for contacting from hot vapor with recycle liquid foul water condensate from said decanter to yield a gaseous effluent containing foul water condensate vapor, turpentine, and noncondensible gases, (d) means for conducting said gaseous effluent to a selective condenser and (e), a selective condenser for cooling the gaseous effluent from said gas/liquid contact vessel to condense the foul water condensate vapor and to yield a gaseous fraction containing turpentine and noncondensible gases for return to said first condenser to condense turpentine from said gaseous fraction, whereby useful foul water condensate and an enhanced yield of turpentine are obtained.

2. The improved apparatus of claim 1 further characterized by storage means for the turpentine.

3. The improved apparatus of claim 2 further characterized by a stripping column for further separating noncondensible gas and turpentine from the gases emanating from the storage means, and means for conducting gases emanating from the storage means to the stripping column.

4. The improved apparatus of claim 3 further characterized by a reflux condenser connected to the stripping column.

5. An improved process for increasing the yield of turpentine recoverable from the hot turpentine, foul water and noncondensible gas - containing vapor issuing from a pulp digester characterized by passing the hot vapor from said pulp digester in contact with recycle liquid foul water condensate condensed from said vapor to form a gaseous effluent containing foul water condensate vapor, turpentine and noncondensible gases, and selectively cooling said gaseous effluent to condense a foul water phase and yield a gaseous turpentine and noncondensible gas phase, recycling at least a portion of said foul water phase for contacting with said hot vapor issuing from said pulp digester, separating the noncondensible gases from the turpentine and noncondensible gas phase, and collecting the turpentine.

* * * * *